No. 4,024. H. A. PITTS. CUTTING AND CRUSHING CORN. PATENTED MAY 1, 1845.
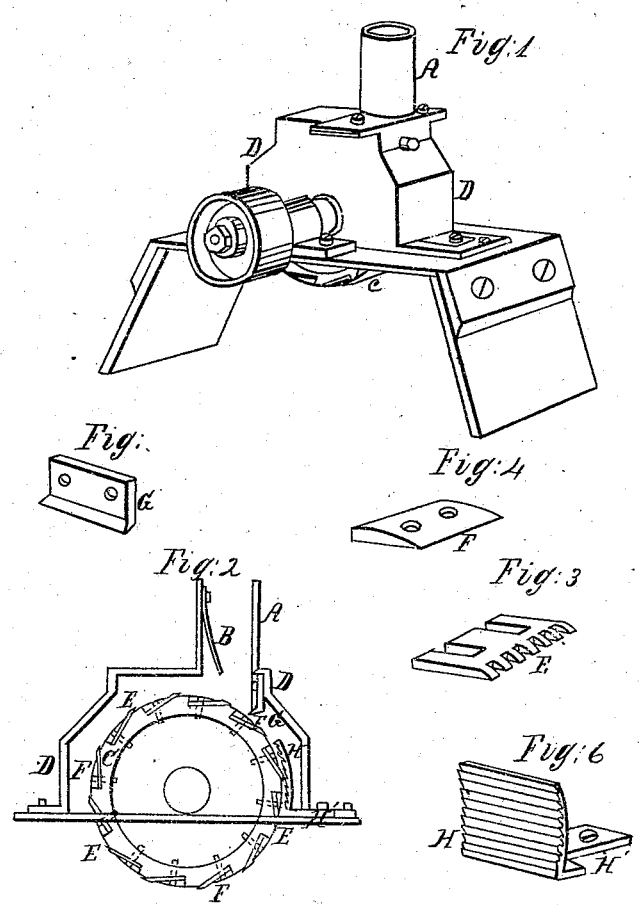

UNITED STATES PATENT OFFICE.

HIRAM A. PITTS, OF WINTHROP, MAINE.

CUTTING AND CRUSHING CORN-FODDER.

Specification of Letters Patent No. 4,024, dated May 1, 1845.

*To all whom it may concern:*

Be it known that I, HIRAM A. PITTS, of Winthrop, in the county of Kennebec and State of Maine, have made a new and useful improvement in the manner of constructing machines for the cutting up and crushing of ears of Indian corn to bring the same into a proper state for the feeding of cattle; and I do hereby declare that the following is a full and exact description thereof.

In the accompanying drawing, Figure 1, is a perspective view of the whole machine. Fig. 2, is a vertical section thereof through its middle from end to end.

In these figures, A, is a tube through which the corn is to be fed into the machine, within which tube a spring, B, may be placed of sufficient strength to hold the corn steady.

C, is a short cylinder, or drum, of metal which is made to revolve within the case D, by any adequate power. This drum is armed with cutters, E, Fig. 3; the edges of which cutters are formed into teeth, as represented. These cutters are adapted to recesses on the periphery of the drum, C, and are held down by plates of metal, F, Fig. 4, through which screws pass, the heads of these screws being countersunk; and the upper surfaces of the plates, F, are curved so as to conform to the curvature of the drum. The cutters, E, project to but a small distance beyond the periphery of the drum, which distance may be regulated at pleasure; and the cutters when they become dull may be readily sharpened.

G, Figs. 2 and 5, is a cutter that is secured by screws to the case, D; this serves to react against the cutters, E, so that no portion of the corn, or the cob, can escape until sufficiently reduced in size.

H, Fig. 6, is a concave, furnished with teeth, as represented. The part H', attached to this concave, projects out through an opening in the case, D, admitting of its being readily set to cut finer, or coarser. The machine will operate well without the concave, by regulating the teeth of the revolving and the stationary cutters; and I intend sometimes to use it, therefore, formed in all respects as above described with the exception of the concave.

Having thus fully described the nature of my improved machine for cutting up, and crushing, the ears of corn, and shown the manner in which the same operates, what I claim therein as new, and desire to secure by Letters Patent, is—

1. The combination of the drum and cutter F, the cutter G, on the case, and the regulating concave, H, so as to coöperate in producing the desired effect in the manner set forth.

2. I likewise claim the combination of the drum and cutter F, and the cutter G, on the case, arranged as above set forth, when used without the adjustable concave.

HIRAM A. PITTS.

Witnesses:
   THOS. P. JONES,
   WM. BISHOP.